UNITED STATES PATENT OFFICE.

JOHN J. VOORHEES, OF JERSEY CITY, NEW JERSEY.

METHOD OF TRANSFERRING EMBOSSED DESIGNS TO RUBBER.

No. 825,565.          Specification of Letters Patent.          Patented July 10, 1906.

Application filed March 19, 1906. Serial No. 306,929.

*To all whom it may concern:*

Be it known that I, JOHN J. VOORHEES, a citizen of the United States, residing in Jersey City, county of Hudson, and State of New Jersey, have invented certain new and useful Improvements in the Methods of Transferring Embossed Designs to Rubber, of which the following is a full, clear, and exact specification.

My invention relates to a method whereby a raised or embossed design may be transferred from paper or other perishable material to a rubber matrix in a simple, cheap, quick, and efficacious manner, so that the original embossed design may be reproduced from the matrix in all of the minuteness of detail of the original embossed design; and my invention consists in the various steps hereinafter set out.

In preparing matrices from which embossed rubber goods are molded a metal matrix has usually been employed, the preparation of which consumes considerable time and is quite expensive, particularly if a complicated design is to be reproduced; but by my invention the most complicated and elaborate design is reproduced with as much ease and as little expense as the simplest and but a short time is required in the process, the results being very beautiful.

In carrying my method into effect I make use of any embossed paper design which possesses a slight degree of stiffness in the embossed part, and an excellent material which I have found available for this purpose is embossed wall-paper, which may be found in a variety of attractive embossed patterns and is made of paper or of some composition of an oily nature. This possesses sufficient rigidity of design for my purpose and is used in my method as follows: The lower plate of a hydraulic or other press is heated by steam or in other suitable manner to a heat of about 220° Fahrenheit, and upon this is placed a sheet of soft rubber that is so prepared that it will become soft by the first application of heat, but is compounded with a large percentage of sulfur or other quick vulcanizing agent in such parts, well known to those skilled in the art, that on the application of a high temperature of about 300° Fahrenheit for a period of about two hours it will quickly harden and become hard enough to serve as a matrix. This sheet of prepared rubber we place between the parallel plates of the press, so that it shall rest upon the lower heated plate. The sheet of paper or other material containing the embossed design which it is desired to transfer to the rubber and which is slightly less in area than the sheet of rubber is then prepared by coating its face, which is to come into contact with the rubber, with a non-adhesive compound, for which purpose I have found a mixture of glycerin and plumbago to give excellent results. The prepared embossed surface of the paper or other material is then placed upon the rubber, and the upper plate of the press is brought into contact with it. This upper plate of the press which comes into contact with the paper or other material containing the embossed design is kept cool in order that it may not destroy the perishable embossed pattern before it has been transferred to the rubber. The perishable paper pattern being then in contact with the cool plate and the rubber in contact with the heated plate, a very gentle pressure is applied by the press of about three hundred pounds on the rams, and the design upon the pattern is forced into the rubber sheet, which is softened by the heat and rendered exceedingly plastic, so that it readily receives the most minute details of the pattern. When this gentle pressure has transferred the design to the rubber, which will usually take not more than two minutes, the pressure upon the plates is increased until it reaches about two thousand pounds on the rams and the temperature of the lower plate gradually raised to the vulcanizing-point, or about 300°, and the rubber sheet is vulcanized into what is practically molded hard rubber. When vulcanization is completed, I remove the embossed paper or perishable pattern from the vulcanized rubber, which has then become a negative matrix from which any number of rubber duplicates of the original pattern may be reproduced by the usual processes.

While I have described the lower plate of the press as being heated and upper one cooled, it is obvious that this order may be reversed and the upper plate heated while the lower one is cooled; likewise that caoutchouc, gutta-percha, or other suitable plastic capable of being rendered soft by a low degree of heat and of being hardened by a higher heat and pressure or by increased pressure and suitable for use as a matrix may be used.

What I claim, and desire to secure by Letters Patent, is—

1. A method of transferring patterns from embossed perishable material such as paper to plastic material which consists in placing said embossed material in contact with a sheet of prepared rubber or other gum susceptible of vulcanization in sheets, in then applying a heated plate of metal or other suitable material to said prepared sheet and a corresponding cool plate to said perishable pattern, in then applying a gentle pressure until said embossed pattern has been transferred to said prepared sheet, in then increasing the pressure upon said plates and raising the temperature of said gum to the point of vulcanization, and maintaining the same until the prepared sheet is thoroughly vulcanized, substantially as described.

2. A method of transferring patterns from embossed perishable material such as paper to plastic material which consists in treating the face of said embossed sheet with a non-adhesive compound, in then placing said embossed material in contact with a sheet of prepared rubber or other gum susceptible of vulcanization in sheets, in then applying a heated plate of metal or other suitable material to said prepared sheet and a corresponding cool plate to said perishable pattern, in then applying a gentle pressure until said embossed pattern has been transferred to said prepared sheet, in then increasing the pressure upon said plates and raising the temperature of said gum to the point of vulcanization, and maintaining the same until the prepared sheet is thoroughly vulcanized, substantially as described.

3. In the process of transferring patterns from embossed perishable material such as paper to gums such as rubber, susceptible of vulcanization in sheets, the use of a heated plate of metal or other suitable material in contact with the gum and a cool plate of corresponding material in contact with the perishable material and of one degree of heat and pressure to transfer the pattern to the gum and of a higher degree of heat and pressure to vulcanize the gum, substantially as described.

4. The method of transferring embossed designs from paper or other perishable material to rubber, which consists in preparing a sheet of rubber so that it shall become softened by a relatively low degree of heat and shall be vulcanized hard by an increase in heat and pressure, in placing this prepared sheet in contact with a plate, in superposing thereon a pattern-sheet of embossed paper or other perishable material, in heating the first-mentioned plate sufficiently to soften the rubber, in applying a cool plate to the pattern, in forcing said plates toward each other by a gentle pressure until the pattern is formed in the softened rubber, in then increasing the pressure and raising the temperature of the rubber to vulcanizing-point and permitting the parts to remain in contact under vulcanizing heat and pressure until the rubber is vulcanized hard, substantially as described.

5. The method of transferring embossed designs from paper or other perishable material to rubber, which consists in preparing a sheet of rubber so that it shall become softened by a relatively low degree of heat and shall be vulcanized hard by an increase in heat and pressure, in placing this prepared sheet in contact with a plate, in superposing thereon a pattern-sheet of embossed paper or other perishable material, the embossed surface of which has been covered with a non-adhesive compound, in heating the first-mentioned plate sufficiently to soften the rubber, in applying a cool plate to the pattern, in forcing said plates toward each other by a gentle pressure until the pattern is formed in the softened rubber, in then increasing the pressure and raising the temperature of the rubber to vulcanizing-point and permitting the parts to remain in contact under vulcanizing heat and pressure until the rubber is vulcanized hard, substantially as described.

In testimony whereof I have hereunto set my hand in the presence of two subscribing witnesses.

JOHN J. VOORHEES.

Witnesses:
 WILLIAM H. SANFORD,
 GEORGE F. COVELL.